United States Patent [19]

Chamberlain

[11] Patent Number: 4,963,226

[45] Date of Patent: Oct. 16, 1990

[54] PROCESS FOR SPRAY-DRYING DETERGENT COMPOSITIONS

[75] Inventor: Harry R. Chamberlain, Hamilton, Ohio

[73] Assignee: The Procter & Gamble Company, Cincinnati, Ohio

[21] Appl. No.: 300,521

[22] Filed: Jan. 23, 1989

[51] Int. Cl.[5] .............................................. B01D 1/18

[52] U.S. Cl. .................................. 159/48.1; 159/4.04; 159/4.06; 159/4.07; 203/90; 252/135; 252/174; 252/530; 252/531; 252/539

[58] Field of Search .................... 159/48.1, 4.04, 4.06, 159/4.07; 34/33, 168; 203/90; 202/236; 252/135, 174, 530, 531, 539

[56] References Cited

U.S. PATENT DOCUMENTS

| | | | |
|---|---|---|---|
| 2,222,396 | 11/1940 | Bowen | 159/4.01 |
| 2,851,097 | 9/1958 | Ledgett | 159/4.01 |
| 2,889,283 | 6/1959 | Tecklenburg | 159/4.3 |
| 3,519,054 | 7/1970 | Cavataio et al. | 159/48.1 |
| 3,629,951 | 12/1971 | Davis et al. | 159/48.1 |
| 3,748,103 | 7/1973 | Bean et al. | 159/48.1 |
| 4,011,302 | 3/1977 | De Frawi | 423/332 |
| 4,261,793 | 4/1981 | Nakamura et al. | 159/48.1 |
| 4,421,594 | 12/1983 | Bildjukevich et al. | 159/48.1 |
| 4,422,900 | 12/1983 | Bordelon et al. | 159/48.1 |
| 4,460,700 | 7/1984 | Candlin et al. | 526/124 |
| 4,478,735 | 10/1984 | Yazaki et al. | 159/16.1 |
| 4,519,990 | 5/1985 | Bevilaqua et al. | 159/48.1 |
| 4,549,978 | 10/1985 | Evans et al. | 159/48.1 |
| 4,784,878 | 11/1988 | Haak | 159/48.1 |

*Primary Examiner*—Virginia Manoharan

*Attorney, Agent, or Firm*—Donald E. Hasse; Thomas H. O'Flaherty; Richard C. Witte

[57] ABSTRACT

A method is provided for spray-drying, large volumes of a detergent slurry in a spray-drying tower which includes spraying at least a portion of the slurry, cocurrently with air having a specified temperature and velocity range, through uniformly spaced atomizing nozzles into a cylindrically shaped drying zone. Any remaining balance of the slurry is sprayed countercurrently into the drying zone at higher levels in the spray tower.

10 Claims, 2 Drawing Sheets

PROCESS FOR SPRAY-DRYING DETERGENT COMPOSITIONS

TECHNICAL FIELD

This invention relates to an improved method and apparatus for spray-drying detergent slurries to form granular detergent compositions. The invention also relates to the resulting improved granular detergent compositions.

BACKGROUND OF THE INVENTION

Spray-drying large volumes (i.e., thousands of pounds per hour) of detergent slurries in a spray-drying tower is a complex procedure involving numerous interrelated factors such as volume and rate of production, slurry ingredients, processing requirements and conditions, massive requirements of drying air, and the desired physical and performance properties of the spray-dried product.

Spray towers have been used employing a single level of atomizing nozzles which are located near the top of the spray-drying chamber. Such spray-drying methods and apparatus are disclosed in U.S. Pat. No. 2,851,097, Ledgett, issued Sept. 9, 1958.

U.S. Pat. Nos. 3,629,951 and 3,629,955, both issued Dec. 28, 1971 to Davis, Hanes and Sagel, disclose granular detergent compositions made by an improved multi-level spray-drying process and apparatus.

U.S. Pat. No. 4,261,793, Nakamura et al, issued Apr. 14, 1981, discloses countercurrently spray-drying a detergent slurry using at least two different levels of uniformly spaced atomizing nozzles.

U.S. Pat. No. 3,519,054, Cavataio et al, issued July 7, 1970, discloses multi-colored granular detergent compositions made by spraying two liquid streams downwardly in a spray tower, one stream being sprayed from a level 15 to 60% below the other, into an upwardly flowing stream of gas.

SUMMARY OF THE INVENTION

It has now been discovered that both single-level and multi-level spray-drying methods known in the art can be improved by spraying at least a portion, but preferably a major amount, of the detergent slurry concurrently with air at certain temperatures and velocites into the drying zone within the spray-drying tower.

As a result of practicing this invention, it is possible to increase the rate of production over conventional single-level and multi-level spray-drying operations. Improved rates can, for example, be on the order of 10–30 percent. In the context of large volume productions, such rate improvement can represent millions of pounds annually.

Surprisingly, this increase in production rate is achieved without resort to more severe heat requirements for the inlet air. Instead, the present spray-drying method provides increased drying efficiencies and better heat utilization by flash drying of the detergent slurry particles at generally lower inlet air temperatures than would otherwise be required to dry the particles using conventional countercurrent spray-drying methods. For example, the present invention allows for a 10–15% reduction in the inlet air temperatures versus countercurrent spray-drying methods. The resulting granules exhibit good physical properties (i.e., they are crisp, free-flowing granules having low caking tendencies) even at higher moisture levels than in granules formed by conventional spray-drying methods.

The present invention has an another advantage of providing an increased measure of control over the bulk density of the final dried granules. For example, it is possible to decrease the density of certain compositions and to increase the density of other compositions. While the most frequent objective in ordinary commercial practices is to produce granules of decreased density, the present invention also provides a reasonable degree of flexibility in achieving greater densities.

The decrease in bulk density can be achieved even through the average particle size is generally smaller. Normally, the finer the spray-dried particle size, the greater the bulk density. However, it is believed that the practice of this invention results in individual particles having a lower specific density and an irregular shape. It is speculated that the combination of these two factors offsets any density increase normally associated with overall finer granular product.

Another advantage of the present method is a decrease in the amount of fine powders and vaporous effluent materials produced. Not only is there less fine powder (tower overs) at the tower exhaust, but there is additional improvement in a decrease in organic (vapor) contaminants which pass into the atmosphere.

Moreover, the present invention provides a further reduction in heavy coarse products (tower tailings). Consequently, by minimizing production of fine powders and coarse granules, the manufacturer is able to increase the amount of product satisfactory for packing and reduce recycle of tower overs and tailings.

A further result of the present invention is that the aforementioned advantages are provided without increasing the amount of insolubles formed by the spraying operation. Such insolubles are believed to be formed by physical and chemical degradations of detergent ingredients due to severe drying conditions. Since the present invention comprises spraying a portion of the detergent slurry into the highest temperature zone adjacent to the hot inlet air that was heretofore intentionally avoided by commercial spray-drying procedures, it was unexpected that granules having good solubility could be obtained.

The present invention also provides an improvement in spray-drying phosphate builders such as sodium tripolyphosphate. One of the limitations in using higher spray-drying temperatures for phosphate-containing detergent compositions has been that overdrying causes reversion of phosphates to other less desirable phosphorus compounds such as pyrophosphates and orthophosphates. The present invention minimizes such reversion.

The above solubility and low phosphate reversion advantages enjoyed by the present invention are attributed to the overall improved drying conditions which are employed. In this respect, one of the major concerns in an ordinary spraying operation is overdrying the freshly sprayed particles as they dry falling through the tower. Ordinarily the hottest zone, the area where the highest isotherms exist, is near the lowest region of the spray chamber. This is the point at which hot air is introduced and dispersed through plenum arrangements. The heated drying gas passes up through the tower countercurrently to the falling atomized particles. As the atomized droplets fall through the rising air currents, they begin to dry. However, the removal of water is relatively slower in the upper tower regions which, while warm, are still cooler than the hotter lower regions. By the time the droplets fall to the higher temperature zone, they have dried sufficiently to have set and solidified to form granules having a hard surface skin. It is these dried granules which by conventional practice must still pass through the highest temperature zone. This can result in overdrying problems such as phosphate reversion and poor granule solubility. The degradation of other heat sensitive detergent additives such as brighteners, nonionic surfactants, and germicides is also known to occur in this region. This can adversely affect the overall performance of the detergent product and increase organic emissions, as well as give rise to unpleasant color and odor problems and other aesthetic negatives.

These overdrying problems are reduced by the present invention. It is believed that spraying of at least a portion of the crutcher slurry concurrently with air at the specified temperatures and velocities results in a less severe time/temperature exposure for the resulting granules. The granules are flash dried and then quickly allowed to drop out of the hot air zone. Thus, granules removed from the base of the tower generally are at a lower temperature. In addition, the sudden release of steam and gases from the flash drying tends to alter and beneficially affect rising air currents. Any remaining balance of the crutcher mix which is sprayed countercurrently into higher levels of the spray tower falls through and is exposed to lower drying temperatures than in conventional countercurrent spray-drying methods. It is believed that this contributes to the beneficial results noted above. As a result, the present invention provides for a high-volume production of crisp, free-flowing, controlled density, uniformly sized granular detergent compositions having good solubility. If phosphates are present in the spray-dried detergent granules, the present invention also provides benefits in terms of low phosphate reversion. Moreover, the above benefits can be achieved at improved rates of production with reduced tower effluents.

The foregoing objects and improvements are achieved by the present invention which in its method embodiments comprises a continuous method for spray-drying large volumes of a detergent slurry in a spray-drying tower and producing a granular detergent composition having controlled density with minimum production of dust particles and other vaporous effluents comprising the following steps:

(a) preparing an aqueous detergent slurry having from about 10 to 50% by weight water and from about 50 to 90% by weight solids content being comprised of at least one detergent surfactant or detergency builder, or mixtures thereof;

(b) establishing within the chamber of the spray tower (a) a cylindrically shaped drying zone with the axis of the chamber by passing heated drying air upwards through the chamber in a cyclonic motion and (b) a low-pressure concentric vortex zone which is formed along the axis of the chamber;

(c) continuously spraying, concurrently with air having a temperature of from about 500° F (260° C.) to 1000° F. (538° C.) and a velocity of from about 3000 to 6000 ft./min. (15.2 to 30.4 m/sec), from about 30 to 100% by weight of said detergent slurry directly into the cylindrically shaped drying zone, said spraying being achieved with atomizing nozzles substantially uniformly spaced in a horizontal plane through the cylindrical drying zone, thereby providing that substantially each of the sprays disintegrates into particles within said cylindrical drying zone;

(d) continuously spraying countercurrently any remaining balance of said detergent slurry directly into the cylindrically shaped drying zone at a higher level in the spray tower than the concurrent spraying of step (c) by means of at least one level of atomizing nozzles substantially uniformly spaced in a horizontal plane through the cylindrical drying zone, thereby providing that substantially each of the sprays disintegrates into particles within said cylindrical drying zone; whereby the only disintegrated particles entering the low-pressure vortex zone are those incidentally carried by the cyclonic motion of the drying gas.

The apparatus and detergent composition aspects of the present invention are apparent from the detailed discussion below.

BRIEF DESCRIPTION OF THE DRAWINGS

Attention is drawn to the four FIGURES comprising part of this application.

Figure 1:
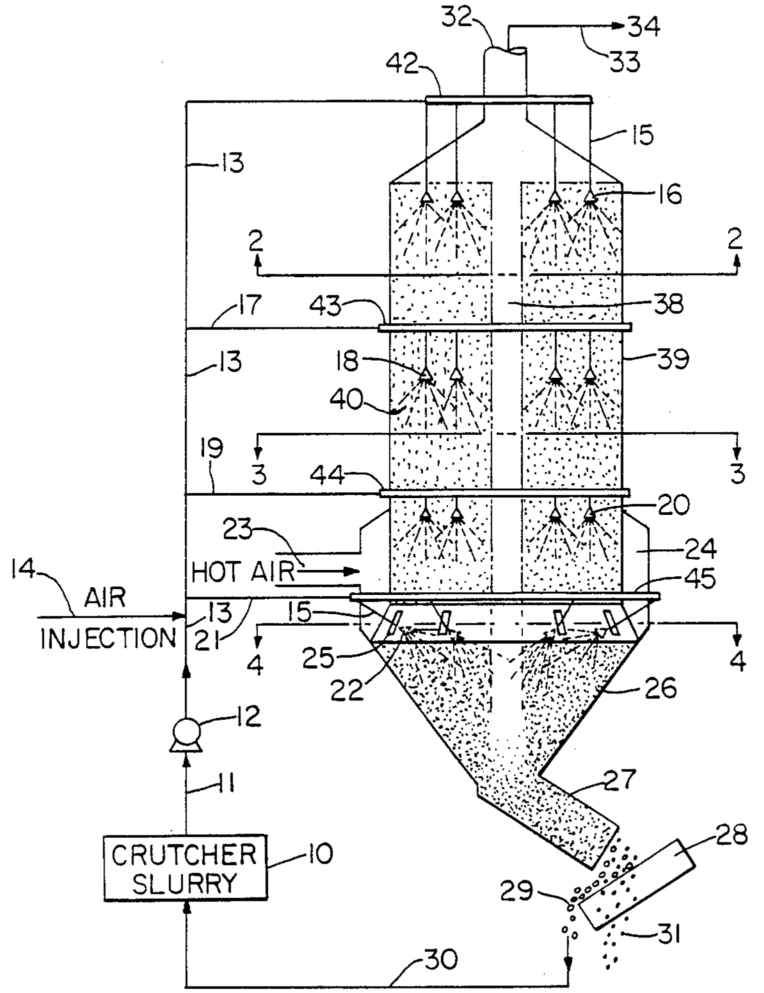
FIG. 1 is a side elevational schematic view illustrating a spray-drying tower incorporating the present invention.

The spray-drying tower apparatus illustrated in the drawing is now described in order to present both the apparatus embodiments and method embodiments of the present invention.

Referring to FIG. 1, box diagram 10 represents a crutcher slurry preparation. This is intended to include an entire conventional crutching or mixing system together with means, 11, for passing it to a high-pressure pump 12. Conventional crutching systems are well familiar to those skilled in the art and typically include storage hoppers for raw materials, conveyors, scales, a crutcher, a drop tank, and the like. For purposes of the present invention, the slurry is comprised of from about 10 to 50% water (preferably from about 20 to 40%) and from about 50 to 90% (preferably from about 60% to about 80%) of solids content (all by weight). The solids content is made up of the ingredients which constitute the formula for the desired granular detergent composition. It contains at least one detergent surfactant or detergency builder, as described hereinafter, or mixtures thereof. The surfactant can be an anionic, nonionic, ampholytic, or zwitterionic type. Preferably, anionic surfactants are employed. It is common to employ mixtures of different detergent surfactants and different builder materials in preparing the slurry.

The slurry is passed through suitable pipes, conduits and the like designated at 11 by means of a high-pressure pump 12. Any suitable pump can be used by preferably those capable of providing pressure in the range of about 400 to 2,000 pounds per square inch (psi) (27.4 to 137 atmospheres), preferably from about 500 to about 1500 psi (34.2 to 103 atmospheres).

Although the invention is susceptible of variation and adaptation with respect to many of the particulars such as the flow ducts, an air injection system is shown at 14. This is a traditional density control means commonly employed. While this is an optional embodiment in terms of this invention, it is a helpful device and its employment is recommended. The amount of air injection into the system from this ancillary source should range from 0 to about 250 standard cubic ft./min. (0 to 1967 standard cubic cm/min.), and preferably from about 50 to 180 standard cubic ft./min. (393 to 1416 standard cubic cm/min.). The air pressure should be at least about 50 psi (3.42 atmospheres) greater than the air pressure provided by the high-pressure pump From the air injection step, the aerated slurry is passed to the spray-drying tower chamber 39 simultaneously by feedline 13 to nozzle arms 15 and atomizing nozzles 16, by feedline 17 to atomizing nozzles 18, by feedline 19 to atomizing nozzles 20, and by feedline 21 to nozzle arms 15 and atomizing nozzles 22. Nozzles 16, 18, 20 and 22 can be any type of nozzle suitable for spray-drying detergent slurries. Preferred are hollow cone nozzles having an orifice of from about 0.125 inches (0.32 cm) to about 0.3125 (0.79 cm) inches in diameter. Such nozzles typically provide a spray of from about 0.5 to 3 feet (0.15 to 0.9 m) in length, and spray at an angle of from about 30° to 75° .

The spray-drying tower is illustrated as comprising a spray-drying chamber 39, having the atomizing nozzles uniformly and discretely spaced therein, a hot air duct 23, passing to a plenum 24 for distributing the hot air into the chamber 39 by a means of hot air inlet ports 25. The hot air by this arrangement is introduced into the chamber 39 in the form of cyclonic motion. For best results, the hot air should have a temperature in the range of about 500° to 1000° F. (260° to 538° C.), preferably about 600 to 800° .F (316 to 427° C.), more preferably from about 675° to 750° F. (357 to 399° C.), to provide the desired flash drying of the particles obtained by spraying the crutcher slurry cocurrently through atomizing nozzles 22. Moreover, the hot air should be introduced into chamber 39 at a velocity of about 3000 to 6000 ft./min. (15.2 to 30.4 m/sec.), preferably about 3500 to 4500 ft./min., (17.8 to 22.9 m/sec.) to provide the desired cyclonic motion without pulverizing the particles on the wall of the spray-drying chamber 39 and cone 26. The air pressure within the chamber 39 and cone 26 typically ranges from about +0.2 to −1.5 inches (0.0005 to −0.0038 kg/square cm) (gage) of water. The cyclonic motion of the heated drying air has an important bearing on the vertical spacing of the nozzles 16, 18, 20 and 22, as well as the horizontal spacing of the nozzles uniformly within each spraying level.

At the base of the spray tower is a cone 26, and conveyor means 27, by which the dried granules are removed. The conveyor means 27 passes the dried granules to a sifting screen 28, at which point coarse granules 29 are gathered and can be recycled by line 30 to the crutcher slurry 10. The desired product granules 31 are collected and packaged or stored.

The top of the spray tower is equipped with gas exhaust means 32. Leading from the exhaust exit is a line 33 designated to lead fine particles to an appropriate treatment or recovery area 34. From this point the spent exhaust gases are passed into the atmosphere.

Within spray chamber 39 there is designated a cylindrical spray-drying zone 40 and a vortex zone 38. The parameters for the cylindrical spray-drying zone 40 and the vortex zone 38 are determined by the cyclonic effect of the rising heated air. It is important to the practice of this invention that the sheets of sprays from the atomizing nozzles disintegrate in the designated cylindrical drying zone. It has been discovered that if this condition is met, the optimum results are obtained in terms of size, reduced stickiness of the granules, reduced production of fine (dust) and coarse granules, and reduced vaporous effluents.

The size of the cylindrically shaped vortex zone can vary depending on several factors including velocity of the heated drying air, size of apparatus, etc. The important consideration with respect to the vortex zone is that it is an area of decreased pressure and temperature and any particles freshly sprayed into this vortex zone are not subjected to the optimum drying influences created by the present invention. Instead, freshly sprayed particles entering into the low-pressure concentric vortex zone fall prematurely through the tower and interfere with the objectives of the invention identified above. The vertical and horizontal spacing of the nozzles must thus be selected so that the sheets of spray from each nozzle disintegrate within the prescribed cylindrical spray-drying zone, and not within the vortex zone. It is in this context that the term "directly into the cylindrical spray-drying zone" is used to indicate the importance of avoiding spraying into the vortex zone.

FIG. also shows another embodiment of this invention, namely the vertical spacing of a plurality of levels of spray nozzles. Special consideration is to be given to positioning of the spray nozzles so that at least a portion (i.e., from about 30% to 100% by weight) of the detergent slurry is sprayed cocurrently with air having the temperature and velocity ranges specified herein. This is fundamental to achieving and optimizing the objectives noted above. In FIG. 1, spraying cocurrently with air is accomplished in the level designated by feedline 21 and atomizing nozzles 22. It is necessary to provide at least 30% by weight of the slurry into this level of the spray nozzles to obtain the maximum benefit of the invention. While amounts up to 100% of the slurry can be fed to this level, it is preferred to remain below about 90% to balance the several processing conditions involved, rate of addition of the heated drying gas, the cyclonic effect, the rate of drying and the like. It is preferred that from about 50 to 85% by weight of the slurry is sprayed into this level of spray nozzles.

When two levels of nozzles are used, the top level can be desirably located in a zone in the tower where temperatures range from about 150° F. (66° C.) to about 250° F. (121° C.).

When three or more levels of nozzles are used, the levels should generally be spaced equidistant from each other so as to avoid overlapping sprays.

Figure 2:
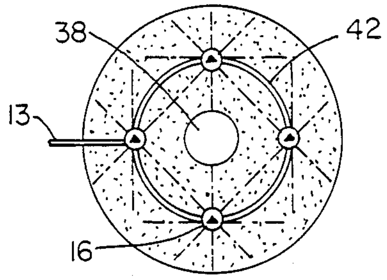
FIG. 2 is an enlarged cross-sectional detail taken along line 2—2 of FIG. 1 and serving to illustrate the cylindrically shaped drying zone, the low-pressure concentric vortex zone, and the manner in which optional atomizing nozzles, which spray the detergent slurry countercurrently to the upward hot air flow, are substantially uniformly spaced in a horizontal plane through the cylindrical drying zone.

In FIG. 2, taken along line 2—2 of FIG. 1, the substantially uniform spacing of atomizing nozzles 16 is illustrated. These nozzles 16 are seen to be part of a manifold ring 42 leading to feedline 13. It is important to space and direct the spray nozzles throughout the tower in such a position that they do not spray too close to the chamber wall 39 or too close to the low-pressure vortex zone 38. If freshly sprayed slurry contacts the wall, it can tend to stick to the wall and build up large deposits. These must be removed with difficulty and they can obstruct the desirable gas flow patterns which the method and apparatus are designed to achieve.

Figure 3:
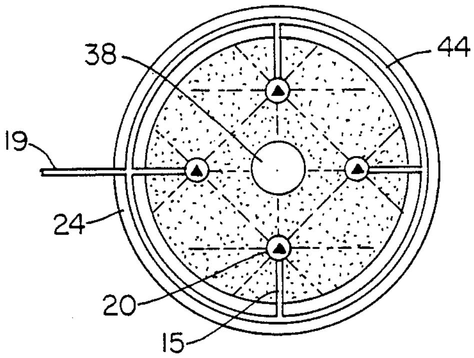
FIG. 3 is an enlarged cross-sectional detail taken along line 3—3 of FIG. 1 and serving to further illustrate the manner in which additional optional atomizing nozzles which spray countercurrently to the hot air flow are substantially uniformly spaced in a horizontal plane through the cylindrical drying zone at a lower level than that shown in FIG. 2.

In FIG. 3, taken along line 3—3 of FIG. 1, the substantially uniform spacing of atomizing nozzles 20 is illustrated. These nozzles 20 are seen to be attached to nozzle arms 15 which are attached to manifold ring 44 leading to feedline 19. As discussed above, it is important to space and direct the spray nozzles throughout the tower in such a position that they do not spray too close to the chamber wall 39 or too close to the low-pressure vortex zone 38.

In FIG. 3, the plenum is indicated as 24.

Figure 4:
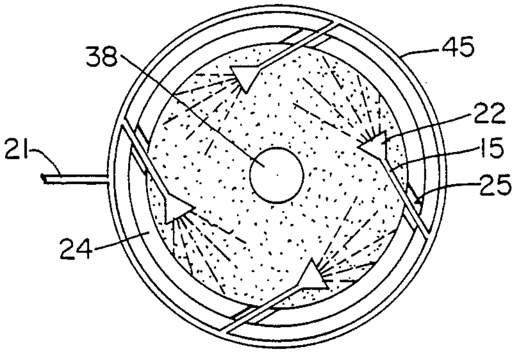
FIG. 4 is an enlarged cross-sectional detail taken along line 4—4 of FIG. 1 and serving to illustrate the manner in which the atomizing nozzles that spray the detergent slurry cocurrently with the hot inlet air are substantialy uniformly spaced in a horizontal plane through the cylindrical drying zone. In this case, the nozzles are located in the lowest level of the spray tower.

In FIG. 4, taken along line 4—4 of FIG. 1, the substantially uniform spacing of atomizing nozzles 22 is illustrated. These nozzles 22 are seen to be attached to nozzle arms 15, which are attached to manifold ring 44 located outside of plenum 24 and leading to feedline 21. The nozzle arms 15 pass through the hot air inlet ports 25 in plenum 24 so that the nozzles 22 are located inside the tower chamber 39. The nozzles 22 can be located anywhere from about 1 inch outside to about 12 inches inside of the chamber 39 so as to spray the slurry at the desired air temperature and velocity. Again, it is important to space and direct the spray nozzles throughout the tower in such a position that they do not spray too close to the chamber wall 39 or too close to the low-pressure vortex zone 38. Preferably, the nozzle arms 15 are protected from the high inlet air temperatures by the addition of nozzle sleeves (not shown) around nozzle arms 15 as they pass through plenum 24.

Detergent Compositions

With the present invention it is possible to prepare detergent compositions of varied formulations.

The detergent surfactant can be selected from well-known classes of anionic, nonionic, ampholytic and zwitterionic detergent surfactants. Mixtures of surfactants can also be employed herein. More particularly, the surfactants listed in Booth, U.S. Pat. No. 3,717,630, issued Feb. 20, 1973, and Kessler et al, U.S. Pat. No. 3,332,880, issued July 25, 1967, each incorporated herein by reference, can be used herein. Nonlimiting examples of surfactants suitable for use in the instant compositions are as follows.

Water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alky portion of acyl groups). Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099, and 2,477,383. Especially valuable are linear straight chain alkylbenzene sulfonates in which the average number of carbon atoms in the alkyl group is from about 11 to 13, abbreviated as $C_{11-13}$ LAS.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium potassium salts of alkyl ethylene oxide ether sulfates containing about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin and paraffin sulfonates containing from about 12 to 20 carbon atoms; and beta-alkyloxy alkane sulfonates containing from about 1 to 3 carbon atoms in the alkyl group and from about 8 to 20 carbon atoms in the alkane moiety.

Preferred anionic surfactants are selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

Water-soluble nonionic surfactants are also useful in the compositions of the invention. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol.

Preferred nonionic surfactants are the water-soluble and water-dispersible condensation products of aliphatic alcohols containing from 8 to 22 carbon atoms, in either straight chain or branched configuration, with from 3 to 12 moles of ethylene oxide per mole of alcohol. Particularly preferred are the condensation products of alcohols having an alkyl group containing from about 9 to 15 carbon atoms with from about 4 to 8 moles of ethylene oxide per mole of alcohol.

Semi-polar nonionic surfactants include water-soluble amine oxides containing one alkyl moiety of from about 10 to 18 carbon atoms and two moieties selected from the group of alkyl and hydroxyalkyl moieties of from about 1 to about 3 carbon atoms; water-soluble phosphine oxides containing one alkyl moiety of about 10 to 18 carbon atoms and two moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic surfactants include derivatives of aliphatic, quaternary, ammonium, phosphonium, and sulfonium compounds in which one of the aliphatic substituents contains from about 8 to 18 carbon atoms.

The detergent surfactant generally comprises from about 5% to about 80%, preferably from about 10% to about 60%, more preferably from about 15% to about 50%, by weight of the spray-dried detergent composition.

In addition to detergent surfactants, detergency builders can be employed in the final granular detergent product. Water-soluble inorganic or organic electrolytes are suitable builders. The builder can also be water-insoluble calcium ion exchange materials. Nonlimiting examples of suitable water-soluble, inorganic detergent builders include: alkali metal carbonates, borates, phosphates, bicarbonates and silicates. Specific examples of such salts include sodium and potassium tetraborates, bicarbonates, carbonates, orthophosphates, pyrophosphates, tripolyphosphates and metaphosphates.

Examples of suitable organic alkaline detergency builders include: (1) water-soluble amino carboxylates and aminopolyacetates, for example, nitrilotriacetates, glycinates, ethylenediaminetetraacetates, N-(2-hydroxyethyl)nitrilo diacetates and diethylenetriamine pentaacetates; (2) water-soluble salts of phytic acid, for example, sodium and potassium phytates; (3) water-soluble polyphosphonates, including sodium, potassium, and lithium salts of ethane-1-hydroxy-1, 1-diphosphonic acid; sodium, potassium, and lithium salts of ethylene diphosphonic acid; and the like; (4) water-soluble polycarboxylates such as the salts of lactic acid, succinic acid, malonic acid, maleic acid, citric acid, oxydisuccinic acid, carboxymethyloxysuccinic acid, 2-oxa-1,1,3-propane tricarboxylic acid, 1,1,2,2-ethane tetracarboxylic acid, mellitic acid and pyromellitic acid; (5) water-soluble polyacetals as disclosed in U.S. Pat. Nos. 4,144,266 and 4,246,495 incorporated herein by reference; and (6) the water-soluble tartrate monosuccinates and disuccinates, and mixtures thereof, disclosed in U.S. Pat. No. 4,663,071 Bush et al, issued May 5, 1987, incorporated herein by reference.

Another type of detergency builder material useful in the final granular detergent product comprises a water-soluble material capable of forming a water-insoluble reaction product with water hardness cations preferably in combination with a crystallization seed which is capable of providing growth sites for said reaction product. Such "seeded builder" compositions are fully disclosed in British Patent No. 1,424,406.

A further class of detergency builder materials useful in the present invention are insoluble sodium aluminosilicates, particularly those described in Belgian Patent No. 814,874, issued Nov. 12, 1974, as having the formula:

$$Na_z\text{-}(AlO_2)\text{-}(SiO_2)_yXH_2O$$

wherein z and y are integers equal to at least 6, the molar ratio of z to y is in the range of from 1.0:1 to about 0.5:1, and X is an integer from about 15 to about 264, said aluminosilicates having a calcium ion exchange capacity of at least 200 milligrams equivalent/gram and a calcium ion exchange rate of at least about 2 grain/-gallon/minute/gram. A preferred material is Zeolite A which is:

$$Na_{12}\text{-}(SiO_2AlO_2)_{12}27H_2O.$$

Preferably, the builder comprises a tripolyphosphate, pyrophosphate, carbonate, polycarboxylate, or aluminosilicate detergency builder, or mixtures thereof.

The detergency builder component generally comprises from about 10% to 90%, preferably from about 15% to 75%, more preferably from about 20% to 60%, by weight of the spray-dried detergent composition.

Optional components which can be included in the granular detergents herein are materials such as cationic surfactants, softening agents, enzymes (e.g., proteases and amylases), bleaches and bleach activators, soil release agents, soil suspending agents, fabric brighteners, enzyme stabilizing agents, color speckles, suds boosters or suds suppressors, anticorrosion agents, dyes, fillers, germicides, pH adjusting agents, nonbuilder alkalinity sources, and the like. Materials listed above which are heat sensitive or degraded by other materials in the crutcher mix slurry are generally admixed with the spray-dried portion of the finished granular detergent composition.

The following nonlimiting examples illustrate the compositions, methods and apparatus of the present invention.

All parts, percentages and ratios herein are by weight unless otherwise specified.

EXAMPLE I

A granular detergent composition of the present invention is prepared containing the following components.

| Component | Wt. % |
|---|---|
| Sodium $C_{12}$ linear alkylbenzene sulfonate | 4.1 |
| Sodium $C_{14-15}$ alkyl sulfate | 6.4 |
| Sodium tallowalkyl sulfate | 6.4 |
| $C_{12-13}$ alcohol polyethoxylate (6.5) | 0.5 |
| Sodium tripolyphosphate | 39.3 |
| Sodium carbonate | 12.3 |
| Sodium silicate solids | 5.6 |
| Polyethylene glycol (MW 8000) | 0.5 |
| Protease enzyme | 0.5 |
| Sodium sulfate | 15.3 |

-continued

| Component | Wt. % |
|---|---|
| Water and minors | Balance |

An aqueous slurry containing, by weight, about 30% water and about 70% of the above components (except for the alcohol polyethoxylate surfactant, enzyme and other minors) is spray-dried in a 21 ft. (6.4 m) diameter spray-drying tower such as illustrated in FIG. The atomizing nozzles are located substantially uniformly spaced in horizontal planes either about 8 ft. (2.4 m) from the top of the tower, about 22 ft. (6.7 m) from the top of the tower, about 35 ft. (10.7 m) from the top of the tower, or about 55 ft. (16.8 m) from the top of the tower, or mixtures thereof. In the present example, 2 nozzles are located in the first or top level, no nozzles are located in the second level, 4 nozzles are located in the third level, and 5 nozzles are located in the forth or lowest level. (Such a nozzle configuration is hereinafter referred to as 2-0-4-5.) All of the nozzles are substantially uniformly spaced in a horizontal plane through the drying zone. About the same amount of slurry is sprayed through each atomizing nozzle. Thus, about 45% of the slurry, by weight, is sprayed through the lowest level of nozzles. As shown in FIG. 1, the slurry is sprayed in the lowest level of nozzles cocurrently with air having a temperature of about 558° F. (292° C.) and a velocity of about 4100 ft./min. (20.8 m/sec.), directly into the cylindrically shaped drying zone at the bottom of the spray tower. About 18% of the slurry, by weight, is sprayed countercurrently to the rising air at about 8 feet (2.4 m) from the top of the tower. About 36% of the slurry, by weight, is sprayed countercurrently to the rising air at about 35 feet (10.7 m) from the top of the tower. Substantially each of the sprays disintegrates into particles within the cylindrical drying zone, and the only disintegrated particles entering the low-pressure vortex zone within the tower are those incidentally carried by the cyclonic motion of the drying gas. The spray-dried granules are collected, and admixed with the enzyme and other minors, after spraying on of the alcohol polyethoxylate surfactant to control dusting, to provide the finished granular detergent composition.

The resulting spray-dried granular detergent composition is crisp, free-flowing and uniformly sized, and has good solubility, low caking tendencies, and low phosphate reversion.

Other methods and compositions of the present invention are obtained when the above example is modified by using nozzle configurations 2-0-0-5, 2-0-2-4, 2-0-4-5, 2-0-0-11, 2-0-2-7, 2-0-2-9, 2-0-2-10, 2-0--2-13, 1-0-0-13, and 0-0-2-13, and inlet air temperatures ranging from 451° F. (233° C.) to 622° F. (328° C.).

Other methods and compositions of the present invention are obtained when the above example is modified by using nozzle configurations 0-0-0-15, 4-2-4-5, 4-0-4-12, 2-0-10-20, and 2-0-6-15, and inlet air velocities ranging from 3000 to 6000 ft./min (15.2 to 30.4 m/sec.).

EXAMPLE II

A granular detergent composition is prepared containing the following components.

| Component | Wt. % |
|---|---|
| Sodium $C_{12}$ linear alkylbenzene sulfonate | 4.1 |
| Sodium tallowalkyl sulfate | 6.4 |
| Sodium $C_{14-15}$ alkyl sulfate | 6.4 |
| $C_{12-13}$ alcohol polyethoxylate (6.5) | 0.5 |
| Sodium toluene sulfonate | 1.0 |
| Sodium tripolyphosphate | 5.6 |
| Tetrasodium pyrophosphate | 22.4 |
| Sodium carbonate | 12.3 |
| Sodium silicate solids | 5.6 |
| Sodium polyacrylate (MW 4500) | 1.2 |
| Polyethylene glycol (MW 8000) | 0.5 |
| Protease enzyme | 0.3 |
| Sodium sulfate | 29.8 |
| Water and minors | Balance |

The composition is prepared as described in Example I using nozzle configurations 2-0-4-5, 2-0-0-10 and 2-0-0-7 and inlet air temperature ranging from 645° F. (341° C) to 684° F. (362° C.) and velocities of about 4100 ft./min. (20.8 m/sec.) to provide compositions of the present invention.

EXAMPLE III

A granular detergent composition is prepared containing the following components.

| Component | Wt. % |
|---|---|
| Sodium $C_{13}$ linear alkylbenzene sulfonate | 10.8 |
| Sodium $C_{14-16}$ alkyl sulfate | 11.3 |
| Tallow fatty acid | 2.2 |
| $C_{12-13}$ alcohol polyethoxylate (6.5) | 1.1 |
| Sodium Zeolite A (hydrated, avg. dia. 3 microns) | 27.9 |
| Sodium silicate solids | 2.4 |
| Sodium carbonate | 16.4 |
| Sodium polyacrylate (MW 4500) | 3.4 |
| Polyethylene glycol (MW 8000) | 1.1 |
| Protease enzyme | 0.4 |
| Sodium sulfate | 14.7 |
| Water and minors | Balance |

The composition is prepared as described in Example I using nozzle configurations 2-0-2-4 and 2-0-0-8 and inlet air temperatures ranging from 588° F. (309° C.) to 611° F. (322° C.) and velocities of about 4100 ft./min. (20.8 m/sec.) to provide compositions of the present invention.

What is claimed is:

1. A continuous method for spray-drying large volumes of a detergent slurry in a spray-drying tower and producing a granular detergent composition having controlled density with minimum production of dust particles and vapor effluents comprising the following steps:

(a) preparing an aqueous detergent slurry having from about 10 to 50% by weight water and from about 50 to 90% by weight solids content being comprised of at least one detergent surfactant or detergency builder, or mixtures thereof;

(b) establishing within the chamber of the spray tower (a) a cylindrically shaped drying zone with the axis of the chamber by passing heated drying air upwards through the chamber in a cyclonic motion and (b) a low-pressure concentric vortex zone which is formed along the axis of the chamber;

(c) continuously spraying, cocurrently with air having a temperature of from about 500° F. (260° C.) to 1000° F. (538° C.) and a velocity of from about 3000 to about 6000 ft./min. (15.2 to 30.4 m/sec), from about 30 to 100% by weight of said detergent slurry directly into the cylindrically shaped drying zone, said spraying being achieved with atomizing nozzles substantially uniformly spaced in a horizontal plane through the cylindrical drying zone, thereby providing that substantially each of the sprays disintegrates into particles within said cylindrical drying zone;

(d) continuously spraying countercurrently any remaining balance of said detergent slurry directly into the cylindrically shaped drying zone at a higher level in the spray tower than the cocurrent spraying of step (c) by means of at least one level of atomizing nozzles substantially uniformly spaced in a horizontal plane through the cylindrical drying zone, thereby providing that substantially each of the sprays disintegrates into particles within said cylindrical drying zone;

whereby the only disintegrated particles entering the low-pressure vortex zone are those carried by the cyclonic motion of the drying gas.

2. A method according to claim 1 wherein the cocurrent spraying is achieved with atomizing nozzles substantially uniformly spaced in a horizontal plane near the bottom of the tower.

3. A method according to claim 1 wherein in step (c) the amount sprayed cocurrently with air is in the range of from about 50 to 85% by weight of the detergent slurry.

4. A method according to claim 1 wherein in step (d) a portion of the detergent slurry is sprayed countercurrently into the cylindrically shaped drying zone by means of at least one level of uniformly spaced atomizing nozzles located at a higher level in the tower where temperatures range from about 150° F. (66° C.) to about 250° F. (121° C.).

5. A method according to claim 4 wherein in step (c) the air has a temperature of from about 675° to 750° F. (357° to 399° C.) and a velocity of from about 3500 to 4500 ft./min. (17.8 to 22.9 m/sec.).

6. A method according to claim 1 wherein the detergent slurry comprises, by weight, from about 20 to 40% water and from about 60% to about 80% of a mixture of at least one detergent surfactants and at least one detergency builders.

7. A method according to claim 6 wherein the detergent surfactant comprises an anionic surfactant.

8. A method according to claim 7 wherein the slurry comprises a detergency builder selected from the group consisting of tripolyphosphate, pyrophosphate, carbonate, polycarboxylate and aluminosilicate detergency builders, and mixtures thereof.

9. A method according to claim 8 wherein in step (c) the amount sprayed concurrently with air is in the range of from about 50 to 85% by weight of the detergent slurry and the concurrent spraying is achieved with atomizing nozzles substantially uniformly spaced in a horizontal plane near the bottom of the tower.

10. A method according to claim 9 wherein the anionic surfactant is selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

* * * * *